Jan. 1, 1929.
W. J. TANGERMAN
1,697,028
CENTER BEARING
Filed July 10, 1926
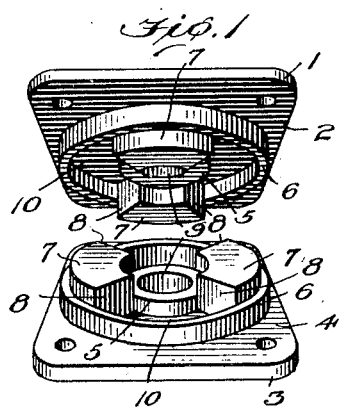
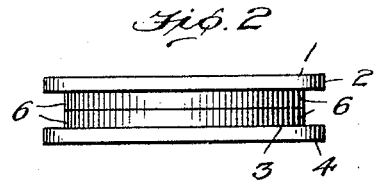
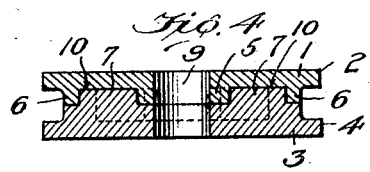
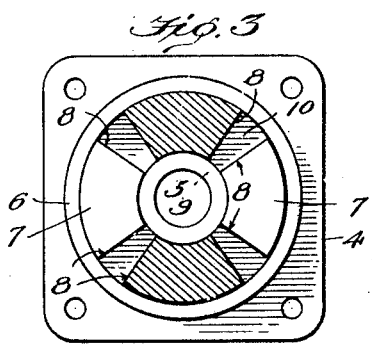
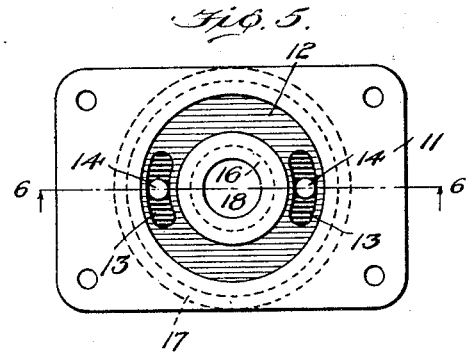
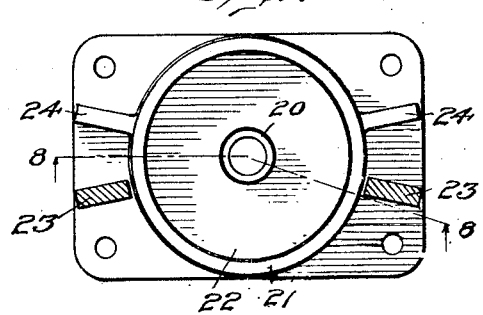
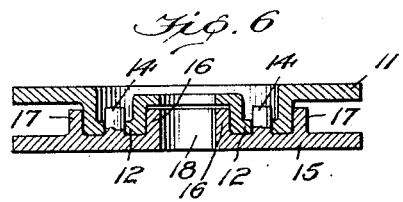
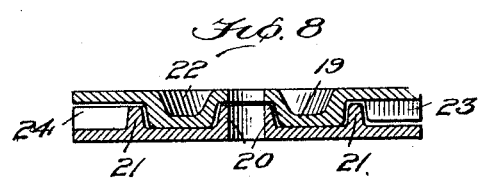
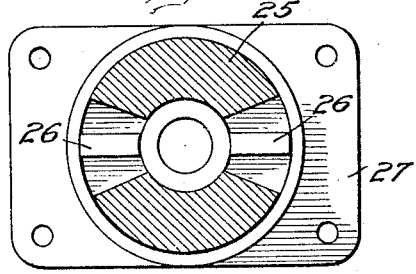
Inventor
William J. Tangerman
By Ritter & Mechlin
his Attorneys Patented Jan. 1, 1929.

1,697,028

UNITED STATES PATENT OFFICE.

WILLIAM J. TANGERMAN, OF HAMMOND, INDIANA.

CENTER BEARING.

Application filed July 10, 1926. Serial No. 121,581.

My invention relates to railway rolling stock and more particularly to the swivel device or center bearing between the truck and car body or the like.

The derailment of railway train equipment, which may result from various causes is not in itself a very serious matter. Serious damage is most frequently caused by one side of the truck being restrained in its forward movement thereby inducing swiveling of the truck resulting in projecting the car entirely off the track and often pulling the next car with it, causing what is termed "buckling". Moreover when the truck is turned to an abnormal extent under the car one of the wheels rubs against the center sill and raises the car body, thus separating the center plates from each other and disconnecting the car from the truck. It is not possible to raise the center sill higher from the rail so as to overcome this undesirable effect, because the height of the draft and center sills is determined by the height of the draft gear and coupler which is prescribed by the American Railway Association. As the diameter of the wheel and its flange is also an American Railway Association standard, practice does not permit the size of the wheels to be decreased.

By my invention a center bearing is produced permitting swiveling movement between the center plates which does not interfere with the freedom of the truck on track curves, but restricting such swiveling movement to a predetermined amount restraining the truck from turning to a sufficient extent to leave the roadbed or to cause the serious effects above mentioned. With my center bearing construction, even though the truck leaves the rails and swivels the maximum permitted amount, its wheels will be preserved in sufficient parallelism with the rails maintaining the train in line, thus permitting the wheels to roll over the roadbed instead of climbing over the rails and leaving the roadbed. It should be remembered that when a truck is derailed at least two wheels (of a four wheel truck) are between the rails. When the truck being in this position, runs along the roadbed it is retarded by the unevenness of the latter thereby very effectively slowing down the train. This is particularly true if the wheels roll upon the ties as bumping on the ties will retard the train and eliminate a major part of the damage done at present when cars buckle.

An object of the invention is to provide a simple, rugged and efficient center bearing which permits sufficient swivel movement between the truck and car body to accommodate service conditions but which restricts the extent of such movement so as to prevent the wheels of the truck from climbing the rail and leaving the roadbed in case of derailment.

The principal feature of the invention, generally stated, consists in providing the upper and lower plates of a center bearing with circular flanges extending toward each other and with radially disposed projections, the circular flanges of each plate being adapted to bearing against the corresponding flanges of the other plate in end to end contact, and the projections of each plate being so formed and related to the projections of the other plate as to provide means for limiting the rotation of the plates.

A further advantageous feature of the invention consists in forming the projections which limit the relative rotation of the center plates in such manner that each projects axially beyond the bearing surface of its associated circular flanges.

Other features of the invention relating to advantageous constructions and combinations of parts will hereinafter appear and be particularly pointed out in the claims.

In the drawings illustrating preferred forms of the invention,—

Figure 1 is a perspective view of a center bearing embodying the invention.

Figure 2 is a side elevation of the bearing in assembled position.

Figure 3 is a top plan view of the lower center plate of the bearing, the projections of the upper center plate being shown in section.

Figure 4 is a vertical sectional view of the assembled device.

Figure 5 is a top plan view of a modified form of the invention.

Figure 6 is a sectional view taken on the line 6—6, Figure 5.

Figure 7 is a top plan view of the lower center plate of another modified form of the invention, the projections of the upper center plate being shown in section.

Figure 8 is a sectional view taken on the line 8—8, Figure 7.

Figure 9 is a top plan view of one of the center plates of still another embodiment of the invention, the projections of the other center plate being shown in section.

The center bearing consists of an upper and lower center plate, the former being generally designated by the numeral 1 and having a base portion 2, and the latter, 3, having a base portion 4. In the embodiment of the invention illustrated in Figures 1 to 4, inclusive, the two plates are duplicates thereby permitting interchangeability and therefore reducing the number of spare parts required to be kept on hand for repairs. Each of these center plates is preferably formed with inner and outer concentrically spaced circular flanges 5 and 6, respectively, which extend toward the flanges of the other plates.

Intermediate the circular flanges and extending axially therebeyond, are diametrically opposed projections or lugs 7, preferably of arcuate shape. The side walls 8 of these projections may advantageously lie wholly within planes extending radially from the center of curvature of the concentric flanges or the center of the king bolt receiving apertures 9.

When in assembled relation the projections 7 on each center plate extend into recesses 10 of the companion center plate, said recesses being defined by the inner and outer concentric flanges 5 and 6 and the associated diametrically opposed projections. Inasmuch as each of the arcuate projections is less than a quadrant of a circle, the lugs 7 of one plate are spaced sufficiently from the lugs of the other plate to allow a relative rotation ample for all service conditions.

It is apparent that a center bearing constructed in this manner affords substantially the same horizontal bearing area between the plates as is found in center bearings having no means for limiting the relative rotation of the plates. This desirable feature is attained by providing for end to end contact of the concentric circular flanges and by having each of the projections bear against the base portion of the opposed plate.

Since the projections 7 of one plate extend beyond their associated flanges and project into the recesses 10 of the other plate, the horizontal component of any strains or stresses imparted to the center bearing is absorbed by the inner and outer peripheral edges of the projections cooperating with the circular flanges, the king bolt thus being relieved from shearing strain.

In the modified form of the invention illustrated in Figures 5 and 6, the upper member 11 of the center bearing is provided with a depressed circular portion 12 having elongated arcuate shaped openings or slots 13 for receiving pins or projections 14 which may, advantageously, be formed integral with the lower member 15 of the said bearing. These pins are positioned between the inner and outer concentric circular flanges 16 and 17, respectively, of the lower member which form a recess for the reception of the depressed portion 12 of the upper member, the inner flange being preferably located immediately adjacent the king bolt opening 18. As is apparent the relative rotation of the plates is limited by the pins or projections 14 contacting with the ends of the slots 13 in the upper member and the king bolt is relieved from horizontal strain by the peripheral edges of the depressed portion 12 contacting with the circular flanges 16 and 17. In this form of construction the plate bearing the pins 14 is preferably secured to the truck bolster while it does not matter which of the plates of the center bearing shown in Figure 1 is secured to the truck bolster as those two plates are duplicates.

The center bearing illustrated in Figures 7 and 8 is substantially the American Railway Association standard bearing with the invention applied thereto. As usual, it comprises an upper plate provided with a depressed portion 19 and a lower plate fashioned with concentrically spaced, circularly shaped flanges 20 and 21 forming a channel or recess 22 into which the depressed portion of the upper plate is adapted to extend. The means for limiting the relative rotation of the plates are located outside of the outer circular flange 21 and may advantageously consist of lugs or projections 23 and 24 mounted on the upper and lower plates respectively.

The construction illustrated in Figure 9 of the drawings is substantially identical with that shown in Figures 1 to 4 inclusive, except that the projections 25 formed on the upper plate are of greater extent than the corresponding lugs or projections 7 formed on the upper plate 1 of the center bearing of Figure 1 and the lugs 26 formed on the lower plate 27 (Fig. 9) are smaller than the corresponding lugs 7 of the lower plate 3.

I claim:—

1. A center bearing for railway cars comprising an upper and a lower center plate each having a base portion and a circular flange extending at an angle thereto, said flanges extending toward each other, one of said plates having interiorly of its circular flange a lug extending axially of the plate so as to project beyond said flange, and the other of said plates having a recess to receive said lug, the lug and recess being associated in a manner to limit relative rotation of the two plates.

2. A center bearing for railway cars involving an upper and a lower center plate, one of said plates having a base portion, a circular flange extending at an angle thereto, and a projection formed on the base portion interiorly of its circular flange, and the other of said plates having a base portion provided with a circular flange adapted to have an end to end contact with the first mentioned flange and also having a recess to receive the said projection, the projection and recess being associated in a manner to limit relative rotation of the two center plates.

3. A center bearing for railway cars comprising a lower center plate and an upper center plate, each of said plates involving a base portion having a circular flange extending toward the other, and a projection within the circular flange extending axially of the plate so as to project beyond said flange, the projections of the two plates cooperating in a manner so as to limit relative rotation of the plates.

4. A center bearing for railway cars comprising an upper center plate and a lower center plate, each of said plates involving a base portion having two concentric circular flanges and a projection disposed between said circular flanges, the flanges of each plate being adapted to bear against the corresponding flanges of the other plate in end to end contact, and the projection of each plate being so formed and related with respect to the projection on the other plate that the two plates are associated for limited rotation only.

In testimony whereof I affix my signature.

WILLIAM J. TANGERMAN.